US012808317B2

(12) United States Patent
Uchida et al.

(10) Patent No.: US 12,808,317 B2
(45) Date of Patent: Nov. 24, 2026

(54) IN-VEHICLE TEMPERATURE ESTIMATION DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Koki Uchida, Yokkaichi (JP); Seiji Takahashi, Yokkaichi (JP); Yuuki Sugisawa, Yokkaichi (JP); Hiroki Tanaka, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 109 days.

(21) Appl. No.: 18/851,276

(22) PCT Filed: Apr. 1, 2022

(86) PCT No.: PCT/JP2022/016989

§ 371 (c)(1),
(2) Date: Sep. 26, 2024

(87) PCT Pub. No.: WO2023/188425

PCT Pub. Date: Oct. 5, 2023

(65) Prior Publication Data

US 2026/0002461 A1 Jan. 1, 2026

(51) Int. Cl.

*F01N 9/00* (2006.01)
*F01N 3/027* (2006.01)

(Continued)

(52) U.S. Cl.

CPC ............. *F01N 9/00* (2013.01); *F01N 3/2013* (2013.01); *F01N 3/027* (2013.01); *F01N 9/005* (2013.01);

(Continued)

(58) Field of Classification Search

CPC combination set(s) only.
See application file for complete search history.

(56) References Cited

U.S. PATENT DOCUMENTS 5,555,725 A 9/1996 Shimasaki et al.
5,740,675 A * 4/1998 Shimasaki ............ F01N 3/2013 60/284

(Continued)

FOREIGN PATENT DOCUMENTS

| | | | |
|---|---|---|---|
| EP | 1898061 | A1 | 3/2008 |
| JP | H10-339130 | A | 12/1998 |
| JP | 2014-134187 | A | 7/2014 |

OTHER PUBLICATIONS

International Search Report, Application No. PCT/JP2022/016989, mailed Jun. 21, 2022. ISA/Japan Patent Office.

*Primary Examiner* — Binh Q Tran
(74) *Attorney, Agent, or Firm* — Brooks Kushman P.C.

(57) ABSTRACT

An in-vehicle temperature estimation device is applied to an in-vehicle heated object heated by current flow. The in-vehicle temperature estimation device includes a power detection unit for detecting the supplied power supplied to the heated object, an arithmetic unit that performs a computation to estimate the temperature of a first location in the heated object, and a temperature determination unit that determines the temperature of the external air outside the heated object. The arithmetic unit performs a computation to estimate the temperature at the first location based on the supplied power detected by the power detection unit and the (Continued)

temperature of the external air determined by the temperature determination unit.

8 Claims, 4 Drawing Sheets

(51) Int. Cl.
*F01N 3/20* (2006.01)
*F01N 11/00* (2006.01)
*F02D 9/02* (2006.01)

(52) U.S. Cl.
CPC ......... *F01N 11/002* (2013.01); *F01N 2550/22* (2013.01); *F01N 2900/0602* (2013.01); *F01N 2900/1602* (2013.01); *F01N 2900/1631* (2013.01); *F02D 2009/0225* (2013.01); *F02D 2200/0416* (2013.01)

(56) References Cited

U.S. PATENT DOCUMENTS

| | | | | |
|---|---|---|---|---|
| 11,162,468 | B2 * | 11/2021 | Nakayama | F02D 41/024 |
| 2012/0247090 | A1 | 10/2012 | Yoshioka et al. | |
| 2013/0305692 | A1 | 11/2013 | Hashimoto | |
| 2019/0040782 | A1 * | 2/2019 | Zenner | F01P 3/20 |
| 2020/0240307 | A1 * | 7/2020 | Matsumura | B01D 53/94 |
| 2020/0340380 | A1 * | 10/2020 | Sato | F01N 9/00 |
| 2021/0189936 | A1 * | 6/2021 | Korenaga | F01N 9/00 |
| 2021/0222638 | A1 * | 7/2021 | Hirooka | F01N 3/2026 |
| 2023/0042626 | A1 * | 2/2023 | Kitaura | F02D 41/1448 |

* cited by examiner

IN-VEHICLE TEMPERATURE ESTIMATION DEVICE

CROSS-REFERENCE TO RELATED APPLICATIONS

This application is the U.S. national stage of PCT/JP2022/016989 filed on Apr. 1, 2022, the contents of which are incorporated herein.

TECHNICAL FIELD

The present disclosure relates to in-vehicle temperature estimation devices.

BACKGROUND

JP 2014-134187A discloses a technology for controlling the supply of electric power to an electrically heated catalyst (hereinafter simply referred to as an EHC (Electrically heated catalyst)) that purifies emissions from an internal combustion engine by means of an EHC control device.

Known methods for obtaining the temperature of an EHC include directly measuring the temperature by embedding a temperature sensor in the EHC or estimating the temperature based on the resistance value of the EHC based on the NTC (negative temperature coefficient) characteristics of the EHC. However, it takes time and effort to embed a temperature sensor. Moreover, the NTC characteristics may have a tendency for the rate of change in resistance value to decrease relative to the rate of change in temperature as the temperature of the EHC increases. If the temperature of the EHC is in a temperature range having this tendency, the temperature estimated based on the resistance value may not be accurate. Therefore, a technology that can accurately estimate the temperature of an EHC is desired.

The present disclosure has been completed in the light of the above-described circumstances and its object is to provide an in-vehicle temperature estimation device capable of accurately estimating the temperature of a heated object.

SUMMARY

An in-vehicle temperature estimation device according to the present disclosure is applied to an in-vehicle heated object that is heated by current flow and includes: a power detection unit for detecting power supplied to the heated object; an arithmetic unit for performing a computation to estimate a temperature of a location in the heated object; and a temperature determination unit for determining a temperature of external air outside the object for heating; in which the arithmetic unit performs a computation to estimate the temperature at the location based on the supplied power detected by the power detection unit and the temperature of the external air determined by the temperature determination unit.

Advantageous Effects

According to the present disclosure, it is possible to accurately estimate the temperature of the heated object.

DETAILED DESCRIPTION OF PREFERRED EMBODIMENTS

Figure 1:
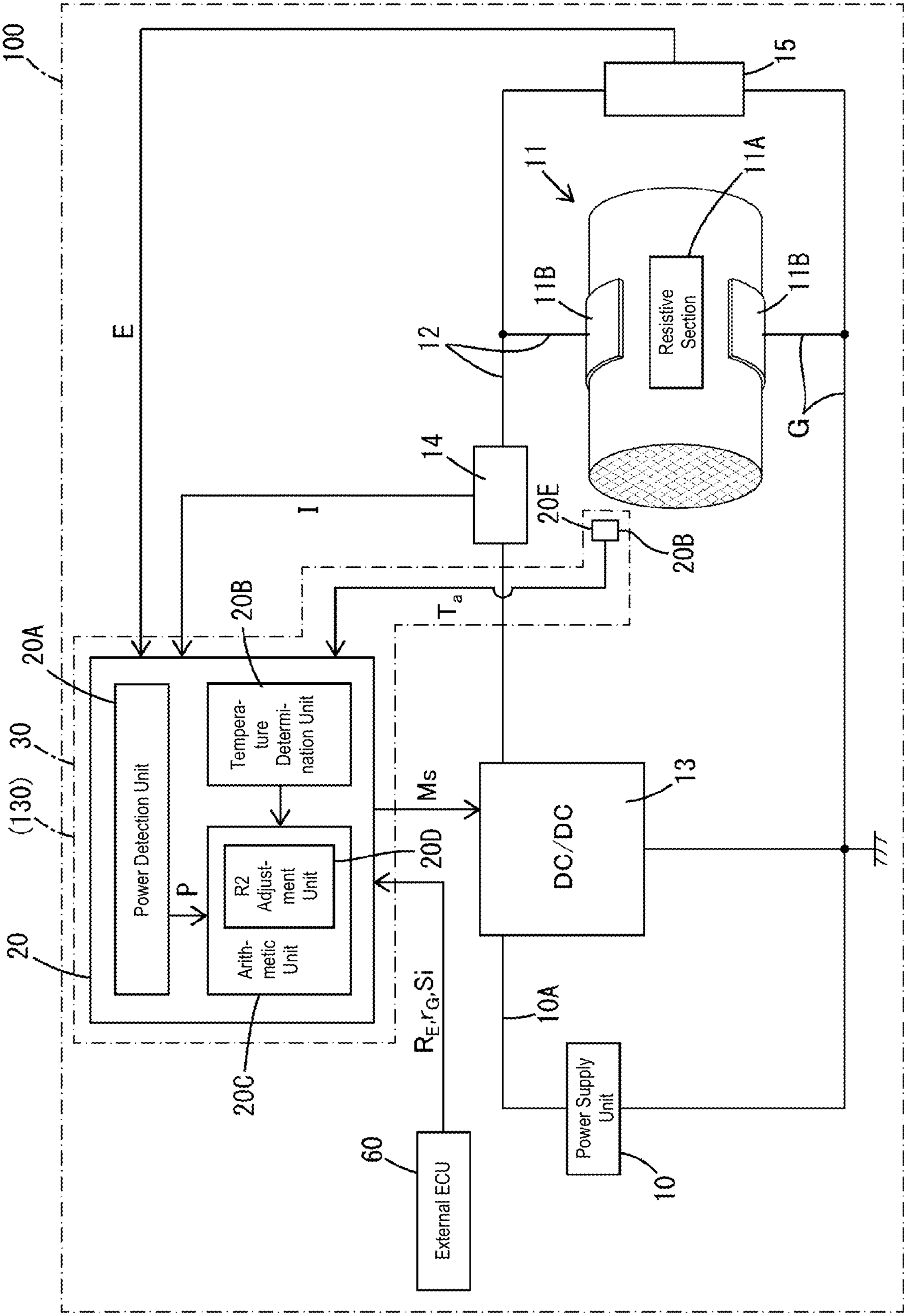
FIG. 1 is a diagram schematically showing the configuration of an in-vehicle system according to a first embodiment.

Embodiments of the present disclosure will be listed and described hereinafter.

In a first aspect, an in-vehicle temperature estimation device according to the present disclosure is applied to an in-vehicle heated object that is heated by current flow. The in-vehicle temperature estimation device includes a power detection unit for detecting power supplied to the heated object; an arithmetic unit for performing a computation to estimate a temperature of a location in the heated object; and a temperature determination unit for determining a temperature of external air outside the heated object. The arithmetic unit performs a computation to estimate the temperature at the location based on the supplied power detected by the power detection unit and the temperature of the external air determined by the temperature determination unit.

The in-vehicle temperature estimation device of the first aspect can estimate the temperature at the location without providing a configuration to directly measure the temperature at the location.

In a second aspect, the temperature of the external air in the first aspect includes the temperature of the inflow gas flowing into the heated object, the temperature determination unit may detect the temperature of the inflow gas, and the arithmetic unit may perform a computation to estimate the temperature at the location based on the supplied power and the temperature of the inflow gas.

As the inflow gas flows into the heated object, it may greatly affect the temperature of the heated object. Therefore, the in-vehicle temperature estimation device in the second aspect can estimate the temperature of the heated object more accurately by detecting the temperature of the inflow gas.

In a third aspect, the arithmetic unit of the first or the second aspects may perform computations to estimate temperatures of a plurality of the locations in the heated object based on the supplied power and the temperature of the external air.

Therefore, as the in-vehicle temperature estimation device in the third aspect estimates temperatures of a plurality of locations, it can estimate the temperature of the heated object more precisely.

In a fourth aspect, the arithmetic unit of the in-vehicle temperature estimation device of the third aspect estimates: a temperature of a first location of the plurality of locations after a predetermined time has elapsed based on a current temperature at the first location, external air side thermal resistance from the first location to the external air of the heated object, heat capacity of the first location, a current temperature of a second location of the plurality of locations that is different from the first location, internal side thermal resistance from the first location to the second location, and the temperature of the external air. The arithmetic unit may estimate a temperature at the second location after a predetermined time has elapsed based on the supplied power, the current temperature at the first location, the current temperature at the second location, internal side thermal resistance from the second location to the first location, and internal side thermal capacity of the second location.

Therefore, as the in-vehicle temperature estimation device in the fourth aspect estimates temperatures of a plurality of locations (the first location and the second location), it can estimate the temperature of the heated object more precisely. Furthermore, the temperature of each location after the elapse of a predetermined infinitesimal time can be known in advance so that the actual temperatures of the locations can be controlled to prevent them from reaching the temperatures to be avoided.

In a fifth aspect, the arithmetic unit of the in-vehicle temperature estimation device of the first or the second aspects may estimate the temperature at the location after a predetermined time has elapsed based on the supplied power, a current temperature at the location, external air side thermal resistance from the location to the external air of the heated object, heat capacity of the location, and the temperature of the external air.

In the in-vehicle temperature estimation device of the fifth aspect, the temperature at the location after the elapse of a predetermined time can be known in advance so that the actual temperature at the location can be controlled to prevent it from reaching the temperature to be avoided.

In a sixth aspect, the in-vehicle temperature estimation device of the fourth or the fifth aspects may further include an adjustment unit for adjusting the external air side thermal resistance based on at least one of the temperature of the external air or a flow rate of the external air flowing into the heated object.

The in-vehicle temperature estimation device in the sixth aspect can estimate the temperature at the location more accurately as it is possible to factor the temperature of the external air or the flow rate of the external air flowing into the heated object into the external air side thermal resistance.

In a seventh aspect, the heated object to which the in-vehicle temperature estimation device of any of the first through the sixth aspects is applied may be an EHC disposed in an emission path of exhaust gas discharged from an internal combustion engine.

The in-vehicle temperature estimation device of the seventh aspect can perform control to excellently purify the exhaust gas by estimating the temperature of the EHC.

In an eighth aspect, the adjustment unit of the seventh aspect, which refers to the sixth aspect, may adjust the external air side thermal resistance based on a rotational speed of the internal combustion engine.

The in-vehicle temperature estimation device of the eighth aspect can estimate the temperature of the EHC more accurately as the possibly ever-changing rotational speed of the internal combustion engine can be factored into the external air side thermal resistance.

In a ninth aspect, the heated object is configured to operate upon receiving power supply from a drive unit, and the in-vehicle temperature estimation device of the first through the eighth aspects comprises a power control unit for controlling the drive unit. The power control unit may generate a temperature maintenance signal for controlling the operation of the drive unit to maintain the temperature at the location within a temperature range of a predetermined temperature maintenance region based on computational results of the arithmetic unit.

The in-vehicle temperature estimation device of the ninth aspect can control the temperature of the heated object by controlling the operation of the drive unit with the temperature maintenance signal generated by the power control unit.

In a tenth aspect, the heated object has the NTC characteristics in which the higher its own temperature rises within a predetermined temperature range, the lower a resistance value becomes. The NTC characteristics have a small change region where a temperature characteristic of the resistance value of the heated object is smaller than a variation of the resistance value, and the arithmetic unit of the in-vehicle temperature estimation device of the ninth aspect may perform a computation to estimate the temperature at the location at least when the temperature of the heated object is in the temperature maintenance region and in the small change region.

The arithmetic unit of the in-vehicle temperature estimation device of the tenth aspect can perform excellent estimation of the temperature at the location when the temperature maintenance region is included in the small change region, where the temperature characteristic of the resistance value of the heated object is smaller than a variation of the resistance value.

First Embodiment

Configuration of in-Vehicle System

An in-vehicle system 100 shown in FIG. 1 includes has a power supply unit 10, a heated object 11, a power path 12, a DC/DC converter 13 serving as a drive unit, a current detection unit 14, a voltage detection unit 15, and an in-vehicle temperature estimation device 30.

The power supply unit 10 is configured as a battery such as a lithium ion battery, for example.

The heated object 11 is, for example, an EHC (Electrically heated catalyst). The heated object 11 is placed, for example, in the exhaust path of gas discharged from an internal combustion engine, and oxidizes the hydrocarbons in the exhaust gas and reduces CO and NOx for purification. The heated object 11 includes a resistive section 11A and an unshown catalyst. The resistive section 11A is composed of a substrate that supports the catalyst. The resistive section 11A is made of an electrically conductive member. The resistive section 11A of the heated object 11 has characteristics in which the resistance value decreases within a predetermined temperature range as its own temperature rises (the so-called NTC characteristics). The resistive section 11A generates heat when electrical power is supplied thereto. The heat generated by the resistive section 11A is transferred to the catalyst. This heats the catalyst. The catalyst is activated when heated. In other words, the heated object 11 is heated by current flow.

Figure 2:
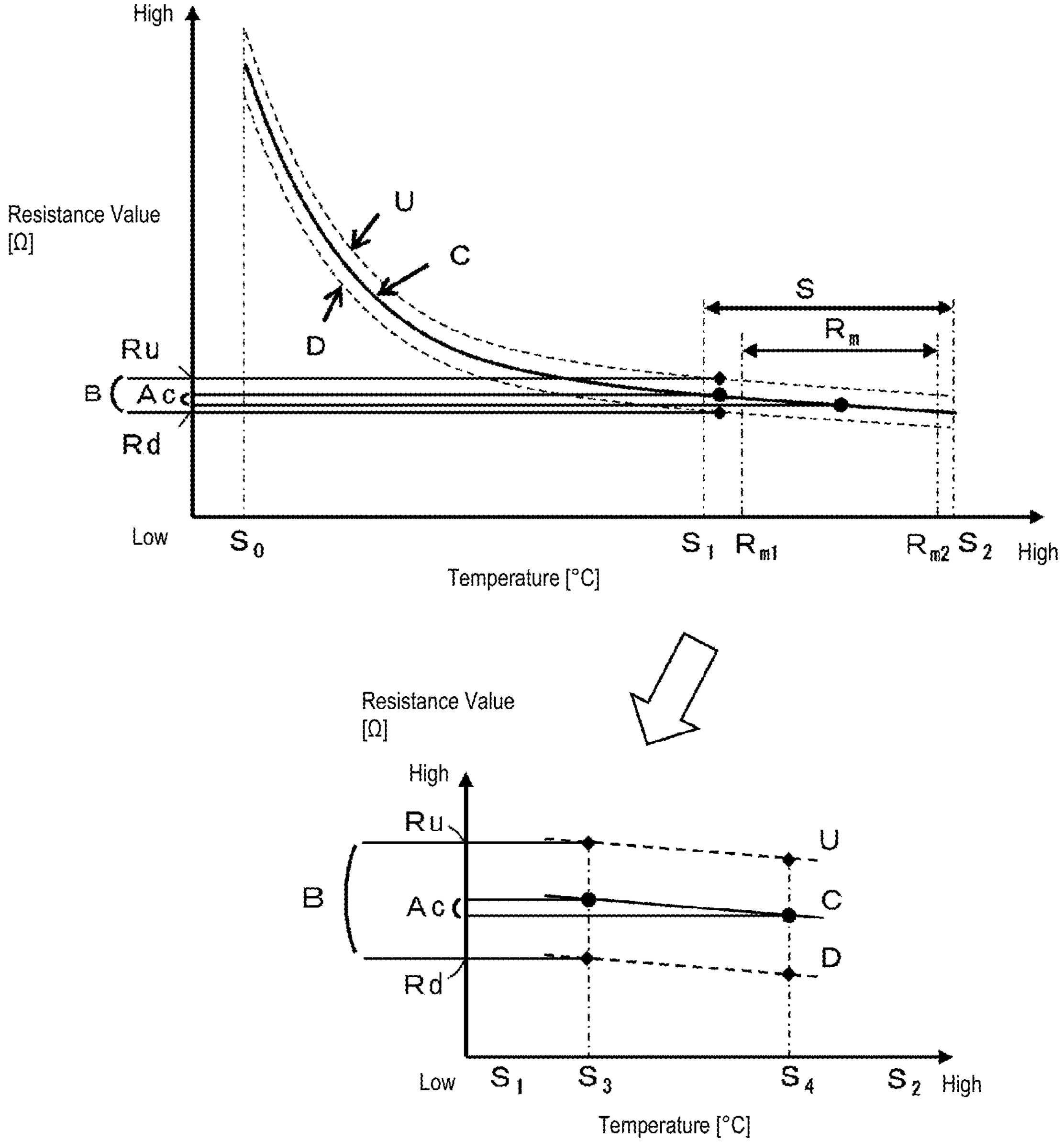
FIG. 2 is a graph showing the characteristics of the resistance and the temperature of the resistive section of the heated object.

The resistive section 11A is subject to a variation (scattering) in its solid state. Specifically as shown in FIG. 2, the NTC characteristics of the resistive section 11A have an upper limit characteristic U that indicates the upper limit of the solid-state variation and a lower limit characteristic D that indicates the lower limit of the solid-state variation. Therefore, the NTC characteristics exhibit a different resistance value at each temperature, with a resistance value Ru at the upper limit characteristic U and a resistance value Rd at the lower limit characteristic D. The difference value between the resistance value Ru and the resistance value Rd is defined as the resistance value variation B (hereinafter simply referred to also as "variation B") of the resistive section 11A.

Furthermore, the NTC characteristics have a central characteristic C between the upper limit characteristic U and the lower limit characteristic D. The central characteristic C is, for example, a characteristic representing the average value of the upper limit characteristic U and the lower limit characteristic D at each temperature. In the NTC characteristics of the resistive section 11A, the temperature region between S1 °C and S2 °C is a small change region S. In other words, the NTC characteristics include a small change region S. Specifically the small change region S is the region where the amount of change Ac in the resistance value of the resistive section 11A of the heated object 11 associated with the temperature change in the central characteristic C (a temperature characteristic of the resistance value of the resistance part 11A) is smaller than the variation B of the resistance value of the resistive section 11A.

For example, the amount of change Ac in the resistance value of the resistive section 11A is the amount of change when the temperature of the heated object 11 changes from S3 °C to S4 °C. (predetermined temperatures) in the range from S1 °C or higher to S2 °C or lower. For example, S4 °C-S3 °C=400 °C to 800 °C. The difference between the resistance value Ru of the upper limit characteristic U and the resistance value Rd of the lower limit characteristic D at a temperature of S3 °C of the heated object 11 is the variation B in the resistance value. For example, the variation B may be 1.6Ω. In other words, the small change region S is the region where the amount of change Ac when the resistance value of the resistive section 11A of the heated object 11 changes by predetermined temperatures (S3 °C to S4 °C) is smaller than the variation B of the resistance value in the range of predetermined temperatures. For example, the amount of change Ac may be 1.2Ω.

When heating the heated object 11, the temperature of the heated object 11 must be maintained at or below a predetermined upper limit and at or above a predetermined lower limit. Specifically the predetermined upper limit is the heatproof temperature of the heated object 11, which is the upper limit temperature at which the progress of degradation of the heated object 11 can be inhibited, and the predetermined lower limit is the target temperature at which the heated object 11 can perform its function as a catalyst. Deterioration of the heated object 11 refers to, for example, excessive heating causing advanced oxidization and brittleness of the material in comparison to when it was initially installed in the exhaust path (i.e., when it was first manufactured) or causing degradation of the material compared to when it was initially installed in the exhaust path so as to be no longer capable of functioning as a catalyst. In FIG. 2, the heatproof temperature, or the predetermined upper limit is Rm2 °C. The target temperature, or the predetermined lower limit, is Rm1 °C. Therefore, by keeping the temperature of the heated object 11 between Rm1 °C or higher and Rm2 °C or lower, the heated object 11 is allowed to function as a catalyst for a longer period of time. The temperature range between Rm1 °C or higher and Rm2 °C or lower is the temperature maintenance region Rm. In other words, the temperature maintenance region Rm is the region of the temperature of the heated object 11 that allows the heated object 11 to function well as a catalyst.

As shown in FIG. 1, the heated object 11 has a cylindrical shape. A pair of electrode plates 11B is attached to the outer peripheral surface of the heated object 11. These electrode plates 11B are formed in a semi-cylindrical shape conforming to the outer peripheral surface of the heated object 11. These electrode plates 11B are positioned opposite to each other on the outer peripheral surface of the heated object 11 so as to sandwich the heated object 11. These electrode plates 11B are positioned at the center in the direction of the central axis of the heated object 11. A power path 12 is electrically connected to one of the electrode plates 11B. A reference conductive path G is electrically connected to the other electrode plate 11B.

The power path 12 is a path for supplying electrical power based on the power supply unit 10 to the resistive section 11A. The power path 12 is located between a DC/DC converter 13 and the heated object 11.

The DC/DC converter 13 is located between the power supply unit 10 and the heated object 11. The DC/DC converter 13, for example, is a step-down type and performs a step-down operation to step down the voltage applied to the power supply side conductive path 10A on the power supply unit 10 side and apply it to the power path 12 on the resistive section 11A side. A semiconductor switching element is used as the DC/DC converter 13. For example, an N-channel FET (field effect transistor) is used as the semiconductor switching element. An N-channel FET is set in the ON state when a voltage at or above the threshold voltage is applied to the gate, and is set in the OFF state when a voltage below the threshold voltage is applied to the gate or no voltage is applied to the gate.

The current detection unit 14 detects a current flowing through the resistive section 11A. The current detection unit 14 is composed of, for example, a current transformer and a shunt resistor. By detecting a current flowing through the power path 12, the current detection unit 14 outputs to the in-vehicle temperature estimation device 30 a voltage value corresponding to the current flowing through the resistive section 11A as a current value I.

By detecting the potential of each of the pair of electrode plates 11B, the voltage detection unit 15 outputs the voltage applied to the resistive section 11A as a voltage value E to a power control unit 20 described below.

The in-vehicle temperature estimation device 30 is a device used in the in-vehicle system 100. The in-vehicle temperature estimation device 30 has an MCU (microcontroller unit), an AD converter, a DA converter, a drive circuit, and a multiplexer, which are not shown in the drawings. The in-vehicle temperature estimation device 30 has the function of estimating the temperature of the heated object 11. The in-vehicle temperature estimation device 30 has a power detection unit 20A, a temperature determination unit 20B, an arithmetic unit 20C, an adjustment unit 20D, and a power control unit 20.

Configuration of Temperature Estimation Device

The power detection unit 20A has the function of detecting the power supplied to the heated object 11 based on the voltage value E detected by the voltage detection unit 15 and the current value I detected by the current detection unit 14. In particular, the power detection unit 20A calculates the power by multiplying the voltage value E by the current value I.

The temperature determination unit 20B has the function of determining the temperature of the external air outside the heated object 11. Specifically the temperature determination unit 20B has an external temperature acquisition unit 20E that acquires the temperature of the exhaust gas, which is the inflow gas flowing into the heated object 11, as the temperature Ta of the external air of the heated object 11. A temperature sensor, for example, a thermistor, is used as the external temperature acquisition unit 20E. The external temperature acquisition unit 20E is located, for example, in the exhaust path of the internal combustion engine and on the internal combustion engine side (i.e., upstream) of the heated object 11 or on the tailpipe's rear end side (i.e., downstream) of the heated object 11. The external temperature acquisition unit 20E has the function of detecting the temperature of the inflow gas, which is the gas immediately before flowing into the heated object 11, or the outflow gas, which is the gas immediately after flowing out of the heated object 11. For example, the external temperature acquisition unit 20E is configured to be able to detect the temperature of the inflow gas after the ignition switch is switched from the OFF state to the ON state and before the internal combustion engine starts operating. The external temperature acquisition unit 20E outputs the temperature detected at this time as the temperature Ta of the external air (ambient temperature) to the power control unit 20, which will be described below.

Figure 3:
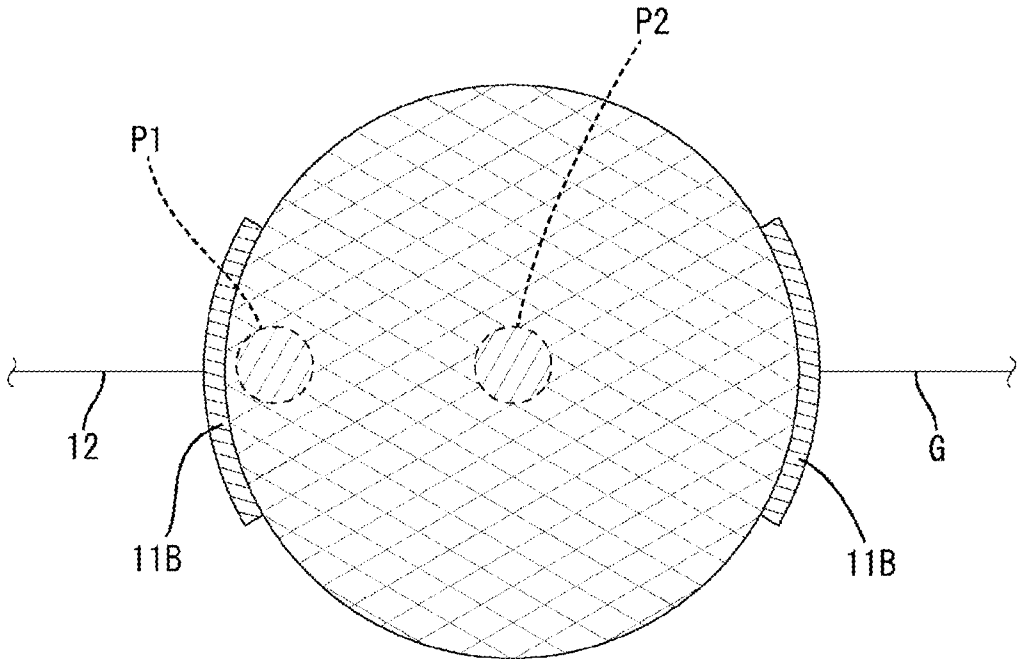
FIG. 3 is a cross-sectional view of the heated object of the first embodiment cut in a direction perpendicular to the central axis thereof.
Figure 4:
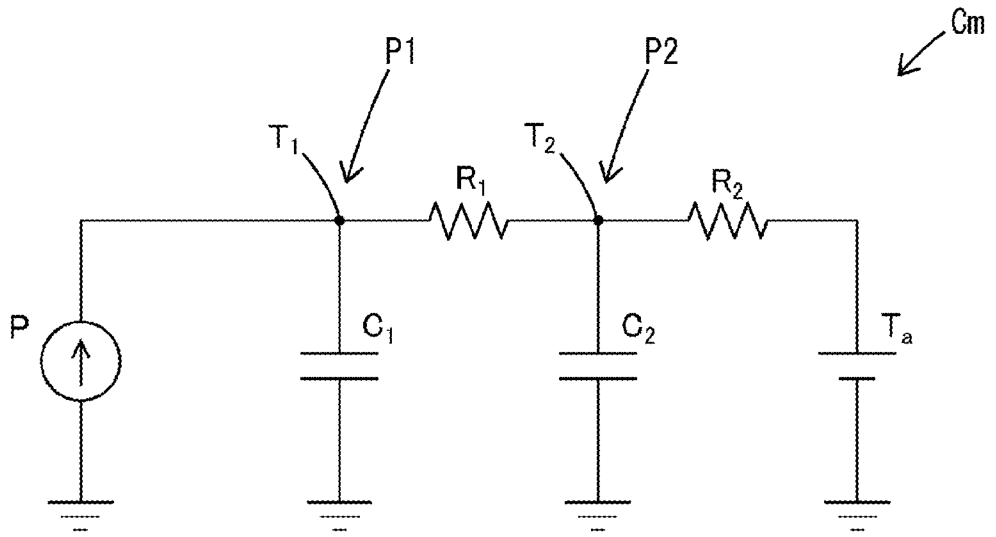
FIG. 4 is a thermal circuit model of the heated object of the first embodiment.

The arithmetic unit 20C has the function of being able to perform computations to estimate the temperatures of a first location P2 (the center of the heated object 11) (see FIG. 3) and a second location P1 of a plurality of locations in the heated object 11. The arithmetic unit 20C estimates the temperature at the first location P2 when the temperature of the heated object 11 is in the temperature maintenance region Rm shown in FIG. 2 and in the small change region S. With the center in the heated object 11 as the first location P2, the arithmetic unit 20C estimates the temperature of this location. The temperature at the first location P2 of the heated object 11 is estimated by using the thermal circuit model Cm shown in FIG. 4, which models the heated object 11.

The thermal circuit model Cm models the flow of heat generated in the resistive section 11A by the supplied power P supplied thereto, which heats the heated object 11, until the heat is released from the heated object 11 to the outside. The thermal circuit model Cm is composed of the supplied power P, the internal side thermal resistance R1, the external air side thermal resistance R2, the internal side heat capacity C1, the heat capacity C2 of the first location P2, and the temperature Ta of the external air.

The supplied power P is the electrical power supplied to the resistive section 11A of the heated object 11. The supplied power P is the value obtained by multiplying the current value I by the voltage value E input from the current detection unit 14 and the voltage detection unit 15. The supplied power P is detected by the power detection unit 20A. The temperature Ta of the external air is the value of the temperature of the inflow gas detected by the external temperature acquisition unit 20E before the internal combustion engine operates and immediately before it flows into the heated object 11. The external temperature Ta of the external air is determined by the temperature determination unit 20B. That is, the external temperature acquisition unit 20E of the temperature determination unit 20B determines the temperature at a location outside of the heated object 11 and different from the first location P2.

The internal side thermal resistance R1, the internal side heat capacity C1, the external air side thermal resistance R2, and the heat capacity C2 of the first location P2 are stored, for example, as predetermined fixed values in a storage area provided in the in-vehicle temperature estimation device 30. The external air side thermal resistance R2 is configured to be capable of being adjusted by the adjustment unit 20D as described below. Furthermore, the internal side thermal resistance R1, the internal side heat capacity C1, the external air side thermal resistance R2, and the heat capacity C2 of the first location P2 may also be selected from computations based on predetermined formulae and values corresponding to the external temperature and the rotational speed of the internal combustion engine in a table of data stored in the storage area.

The internal side thermal resistance R1 is configured to represent the difficulty of heat transfer between the first location P2 and the second location P1, which is different from the first location P2 (hereinafter also referred to as "second location P1"). The second location P1 is, for example, on the outer circumferential portion of the heated object 11 where it is covered by the electrode plate 11B electrically connected to the power path 12 (see FIG. 3). The external air side thermal resistance R2 is configured to represent the difficulty of heat transfer between the first location P2 and the periphery of the heated object 11. The larger the values of the internal side thermal resistance R1 and the external air side thermal resistance R2, the more difficult it is for heat to be transferred, and the smaller the values, the easier it is for heat to be transferred.

The internal side heat capacity C1 is configured to represent the amount of heat that can accumulate at the second location P1. The heat capacity C2 of the first location P2 is configured to represent the amount of heat that can accumulate at the first location P2. The temperature Ta of the external air is determined by the temperature around the heated object 11.

The heat flow at the second location P1 is expressed by the following formula denoted by Math. 1.

$$P*\Delta t+\frac{(-T_1+T_2)}{R_1}*\Delta t=C_1*(T_{1\Delta t}-T_1) \quad \text{[Math. 1]}$$

P is the power supplied to the resistive section 11A of the heated object 11, and Δt is a predetermined infinitesimal time. $T_{1\Delta t}$ is the temperature at the second location P1 when Δt has elapsed since the current time, $T_1$ is the current temperature at the second location P1, and $T_2$ is the current temperature at the first location P2. P*Δt is the quantity of heat flowing to the second location P1 of the heated object 11, $((-T_1+T_2)/R_1)*\Delta t$ is the quantity of heat flowing from the second location P1 into the first location P2, and $C_1*(T_{1\Delta t}-T_1)$ is the quantity of heat accumulated at the second location P1. From the formula denoted by Math. 1, the arithmetic unit 20C estimates the temperature $T_{1\Delta t}$ at the second location P1 after a predetermined infinitesimal time Δt has elapsed based on the supplied power P, the current temperature $T_2$ at the first location P2, the current temperature $T_1$ at the second location P1, the internal side thermal resistance $R_1$ from the second location P1 to the first location P2, and the internal side heat capacity $C_1$ of the second location P1.

The heat flow at the first location P2 is expressed by the following formula denoted by Math. 2.

$$\frac{(T_1-T_2)}{R_1}*\Delta t+\frac{(-T_2+T_a)}{R_2}*\Delta t=C_2*(T_{2\Delta t}-T_2) \quad \text{[Math. 2]}$$

Ta is the temperature of the external air (i.e., the temperature around the heated object 11) detected by the external temperature acquisition unit 20E, and $T_{2\Delta t}$ is the temperature at the first location P2 when Δt has elapsed since the current time. $((T_1-T_2)/R_1)*\Delta t$ is the quantity of heat flowing from the second location P1 to the first location P2, $((-T_2+T_a)/R_2)*\Delta t$ is the quantity of heat released from the first location P2 to the outside of the heated object 11, and $C_2*(T_{2\Delta t}-T_2)$ is the quantity of heat accumulated at the first location P2. From the formula denoted by Math. 2, the arithmetic unit 20C estimates the temperature $T_{2\Delta t}$ at the first location P2 after a predetermined infinitesimal time Δt has elapsed based on the current temperature $T_2$ at the first location P2, the external air side thermal resistance $R_2$ from the first location P2 to the external air of the heated object 11, the heat capacity $C_2$ of the first location P2, the current temperature $T_1$ at the second location P1, which is in the heated object 11 and different from the first location P2, the internal side thermal resistance $R_1$ from the first location P2 to the second location P1, and the temperature $T_a$ of the external air. In other words, the arithmetic unit 20C performs computations to estimate the temperatures at the first location P2 and the second location P1 (multiple locations) in the heated object 11 based on the supplied power P and the temperature Ta of the external air.

For example, if the start switch (e.g., ignition switch) of the vehicle in which the in-vehicle system 100 is installed is in the OFF state, it is assumed that $T_1=T_2=T_a$. This formula is valid when the temperature of the heated object 11 has sufficiently dropped to be the same as the temperature $T_a$ of the external air by maintaining the start switch in the OFF state for a long time. Therefore, $T_{1\Delta t}$ and $T_{2\Delta t}$ can be obtained by assuming $T_1=T_2=T_a$ when initially performing the computations of Math. 1 and Math. 2 at the arithmetic unit 20C. The value detected by the external temperature acquisition unit 20E before the activation of the internal combustion engine is used as Ta. Then, when the arithmetic unit 20C performs the computations of Math. 1 and Math. 2 in the next cycle, $T_{1\Delta t}$ and $T_{2\Delta t}$ after the elapse of another Δt are obtained by substituting the previously obtained $T_{1\Delta t}$ and $T_{2\Delta t}$ into $T_1$ and $T_2$, respectively. Thus, the arithmetic unit 20C repeats the computations of Math. 1 and Math. 2 at each predetermined cycle (e.g., each Δt) based on the supplied power P detected by the power detection unit 20A and the temperature of the inflow gas determined by the temperature determination unit 20B (the result of detection by the external temperature acquisition unit 20E). Then, the arithmetic unit 20C performs estimation to sequentially estimate the temperature $T_{1\Delta t}$ at the second location P1 after the elapse of an infinitesimal time Δt and the temperature $T_{2\Delta t}$ at the first location P2 after the elapse of an infinitesimal time Δt.

The degree to which heat is transferred in the heated object 11 varies according to the temperature and flow rate of the gas (the exhaust gas from the internal combustion engine) flowing into the heated object 11. Therefore, it is possible to accurately estimate the temperature of the heated object 11 by taking into account the temperature and flow rate of the gas (exhaust gas from the internal combustion engine) flowing into the heated object 11.

For example, the external air side thermal resistance R2 has an inversely proportional relationship to the value obtained by multiplying the convective heat transfer coefficient h by the area A of the heated object 11 in contact with the exhaust gas of the internal combustion engine. That is, the external air side thermal resistance $R_2$ becomes smaller as the convective heat transfer coefficient h increases. As used herein, the convective heat transfer coefficient h is a value that expresses the ease with which heat is transfer between the inflow gas (the exhaust gas from the internal combustion engine) that flows into the heated object 11 and the heated object 11. The convective heat transfer coefficient h has the property of increasing in proportion to the increase in the flow rate $V_P$ of the inflow gas (the exhaust gas from the internal combustion engine) flowing into the heated object 11 (hereinafter simply referred to also as "flow rate $V_P$"). The flow rate $V_P$ can be obtained by the following formula denoted by Math. 3, which uses the rotational speed $R_E$ of the internal combustion engine (hereinafter simply referred to also as "rotational speed $R_E$") and the volume ratio $r_G$ between the exhaust and intake air in the internal combustion engine (hereinafter simply referred to also as "volume ratio $r_G$").

$$V_P[\mathrm{m}^3/\mathrm{s}] = RE[\mathrm{s}^{-1}]\frac{D[\mathrm{m}^3]}{2}r_G \quad \text{[Math. 3]}$$

D[m3] is the displacement of the internal combustion engine and is a fixed value determined by the specifications of the internal combustion engine. That is, the flow rate VP is proportional to the rotational speed RE and the volume ratio rG. Therefore, the convective heat transfer coefficient h is proportional to the flow rate VP, the rotational speed RE, and the volume ratio rG. Additionally the external air side thermal resistance R2 is inversely proportional to the convective heat transfer coefficient h, the flow rate VP, the rotational speed RE, and the volume ratio rG. In other words, the external air side thermal resistance R2 decreases as the flow rate VP, the rotational speed RE, and the volume ratio rG increase.

For example, the power control unit 20 is configured so that the rotational speed RE, and the volume ratio rG are input thereto from an external ECU 60.

For example, the adjustment unit 20D is configured to calculate the flow rate VP based on the rotational speed $R_E$ and the volume ratio $r_G$ using the formula denoted by Math. 3, and to calculate an adjustment value Ad for the adjustment of the external air side thermal resistance $R_2$ using the calculated flow rate $V_P$ at each predetermined cycle (e.g., at each Δt). To calculate the adjustment value Ad using the flow rate VP at the adjustment unit 20D, for example, it is conceivable to perform computations based on a predetermined formula or to select an adjustment value Ad corresponding to the flow rate $V_P$ from a table data stored in itself. The, the adjustment unit 20D adjusts the external air side thermal resistance $R_2$ by subtracting the adjustment value Ad from the stored external air side thermal resistance $R_2$. The arithmetic unit 20C then estimate the temperature at the first location P2 using the external air side thermal resistance $R_2$, which has been adjusted at the adjustment unit 20D. In this way the arithmetic unit 20C estimates the temperature of the heated object 11 in a manner that factors in the rotational speed RE and the volume ratio $r_G$.

The larger the flow rate VP, the rotational speed RE, and the volume ratio rG, the more adjustments the adjustment unit 20D makes to decrease the external air side thermal resistance R2 by changing the adjustment value Ad to decrease the external air side thermal resistance R2. Also, the smaller the flow rate VP, the rotational speed RE, and the volume ratio rG, the more adjustments the adjustment unit 20D makes to increase the external air side thermal resistance R2 by changing the adjustment value Ad to increase the external air side thermal resistance R2. It should be noted that the volume ratio rG may be a fixed value.

Furthermore, when T2Δt is larger than Ta, the adjustment unit 20D makes adjustments to decrease the external air side thermal resistance $R_2$ by changing the adjustment value Ad to decrease the external air side thermal resistance $R_2$ as the difference between $T_{2\Delta t}$ and $T_a$ becomes larger (i.e., $T_{2\Delta t}$ becomes larger). Also, when $T_{2\Delta t}$ is larger than $T_a$, the adjustment unit 20D makes adjustments to increase the external air side thermal resistance $R_2$ by changing the adjustment value Ad to increase the external air side thermal resistance $R_2$ as the difference between $T_{2\Delta t}$ and $T_a$ becomes smaller (i.e., $T_{2\Delta t}$ becomes smaller). For example, it is conceivable to add a value calculated based on a predetermined formula or a value from the table data stored in itself that corresponds to the difference between $T_{2\Delta t}$ and $T_a$ to the adjustment value Ad and then subtract the adjustment value Ad from the external air side thermal resistance $R_2$.

Thus, in addition to the flow rate VP, the rotational speed RE, and the volume ratio rG, the adjustment unit 20D also factors in the temperature T2Δt at the first location P2 to calculate the adjustment value Ad at each predetermined cycle (e.g., each Δt). That is, the adjustment unit 20D adjusts the external air side thermal resistance R2 based on the temperature Ta of the external air and the flow rate VP of the gas flowing into the heated object 11. The arithmetic unit 20C then performs an estimation of the temperature at the first location P2 using the external air side thermal resistance R2, which has been adjusted at the adjustment unit 20D.

The power control unit 20 is comprised of a power detection unit 20A, a temperature determination unit 20B, an arithmetic unit 20C, an adjustment unit 20D, an MCU, an AD converter, a DA converter, a drive circuit, and a multiplexer. The power control unit 20 is configured to output a temperature maintenance signal Ms having a set duty ratio to the DC/DC converter 13 to enable duty ratio control to turn the DC/DC converter 13 ON and OFF. Duty ratio control is, for example, PWM (pulse width modulation) control. Duty ratio refers to the ratio of the ON time to the cycle. The duty ratio setting is adjustable. For example, duty ratio control is performed by the MCU included in the power control unit 20 and the drive circuit. That is, the power control unit 20 controls the DC/DC converter 13.

The power control unit 20 starts duty ratio control when the start condition is satisfied. For example, the start condition is that the start switch (e.g., ignition switch) of the vehicle, on which the in-vehicle system 100 is installed, is switched to the ON state. The power control unit 20 is configured, for example, to receive from an external ECU 60 an ON/OFF signal Si that indicates the ON/OFF state of the start switch of the vehicle, and judges whether the start switch has been switched to the ON state based on this ON/OFF signal Si. When the start condition is satisfied, the power control unit 20 starts duty ratio control by outputting to the DC/DC converter 13 the temperature maintenance signal Ms generated based on the temperature $T_{2\Delta t}$ at the first location P2 estimated by the arithmetic unit 20C.

Operation of Temperature Estimation Device

The following describes one example of the operation of the in-vehicle temperature estimation device 30. First, the start switch of the vehicle, on which the in-vehicle system 100 is installed, is switched to the ON state. Then, an ON/OFF signal Si that indicates the ON state is input to the power control unit 20 from the external ECU 60.

Prior to the start of the operation of the internal combustion engine, the temperature determination unit 20B acquires from the external temperature acquisition unit 20E the temperature of the inflow gas immediately before it flows into the heated object 11 (i.e., the temperature Ta of the external air).

Then, when the start condition is satisfied prior to the start of the operation of the internal combustion engine, the power control unit 20 generates a temperature maintenance signal Ms based on the temperature of the inflow gas immediately before it flows into the heated object 11 acquired from the external temperature acquisition unit 20E. Then, the power control unit 20 outputs the generated temperature maintenance signal Ms to the DC/DC converter 13 to start duty ratio control. Subsequently the temperature of the heated object 11 rises after power supply to the resistive section 11A is started, and when the temperature of the heated object 11 reaches a predetermined temperature, the operation of the internal combustion engine starts. The condition for starting operation of the internal combustion engine is, for example, that the temperature $T_{2\Delta t}$ at the first location P2 and the temperature $T_{1\Delta t}$ the second location P1, estimated by the arithmetic unit 20C, have reached or exceeded Rm1 °C, or the lower limit temperature of the temperature maintenance region Rm.

Subsequently after the start of operation of the internal combustion engine, the rotational speed RE and the volume ratio rG are input to the power control unit 20 from the external ECU 60. Then, the adjustment unit 20D calculates the flow rate VP based on the rotational speed RE and the volume ratio rG, calculates the adjustment value Ad using the calculated flow rate VP, and starts adjusting the external air side thermal resistance R2 using the adjustment value Ad.

Then, the power control unit 20 starts duty ratio control. In duty ratio control, the power control unit 20 generates a signal with a set duty ratio (for example, a PWM signal), and outputs this signal to the DC/DC converter 13 as a temperature maintenance signal Ms. As a result, the semiconductor switching device of the DC/DC converter 13 is duty ratio-controlled by the power control unit 20, DC current is supplied to the resistive section 11A, and current value I and voltage value E are input to the power control unit 20 from the current detection unit 14 and the voltage detection unit 15. Then, the power detection unit 20A detects the supplied power P to be supplied to the heated object 11 based on the current value I and the voltage value E. That is, the heated object 11 is configured to operate upon receiving power supply from the DC/DC converter 13.

The arithmetic unit 20C sequentially calculates and obtains the temperatures T1Δt and T2Δt based on the temperature Ta of the external air acquired by the temperature determination unit 20B and the supplied power P detected by the power detection unit 20A. Then, the arithmetic unit 20C continues to estimate the temperatures T1Δt and T2Δt at the second location P1 and the first location P2 at each predetermined cycle (e.g., each Δt).

Then, when the temperature $T_{2\Delta t}$ becomes larger than the temperature $T_a$ of the external air, the adjustment unit 20D adjusts the external air side thermal resistance $R_2$ by further taking into account the difference between the temperature $T_{2\Delta t}$ and the temperature Ta of the external air. The arithmetic unit 20C continuously uses the external air side thermal resistance $R_2$ adjusted at the adjustment unit 20D to perform the computations of Math. 1 and Math. 2 to estimate the temperatures $T_{1\Delta t}$ and $T_{2\Delta t}$ at the second location P1 and the first location P2.

The power control unit 20 changes the duty ratio of the temperature maintenance signal Ms of the duty ratio control based on the temperature $T_{2\Delta t}$ at the first location P2 estimated by the arithmetic unit 20C. Specifically, the size of the duty cycle output to the DC/DC converter 13 (i.e., the temperature maintenance signal Ms) is adjusted so that the temperature $T_{2\Delta t}$ is within the temperature maintenance region Rm in FIG. 2. For example, if the estimated temperature $T_{2\Delta t}$ becomes larger than the temperature maintenance region Rm, the power control unit 20 reduces the duty ratio and the electrical current supplied to the resistive section 11A. If the estimated temperature $T_{2\Delta t}$ becomes smaller than the temperature maintenance region Rm, the power control unit 20 increase the duty ratio and the electrical current supplied to the resistive section 11A. In this way, the heated object 11 is maintained within the temperature range of the temperature maintenance region Rm by the temperature maintenance signal Ms output from the power control unit 20 (i.e., the outside). Thus, the power control unit 20 generates a temperature maintenance signal Ms for controlling the operation of the DC/DC converter 13 to maintain the temperature at the first location P2 within the temperature range of the predetermined temperature maintenance region Rm based on the computational results of the arithmetic unit 20C. It should be noted that the duty ratio may be changed by also taking into account the temperature $T_{1\Delta t}$ estimated at the second location P1.

The effects of this configuration will be explained hereinafter.

The in-vehicle temperature estimation device 30 is applied to the in-vehicle heated object 11, which is heated by current flow. The in-vehicle temperature estimation device 30 has a power detection unit 20A, an arithmetic unit 20C, and a temperature determination unit 20B. The power detection unit 20A detects the supplied power P supplied to the heated object 11. The arithmetic unit 20C performs computations to estimate the temperatures at the first location P2 and the second location P1 of the heated object 11. The temperature determination unit 20B determines the temperature $T_a$ of the external air outside the heated object 11. The arithmetic unit 20C performs computations to estimate the temperatures at the first location P2 and the second location P1 based on the supplied power P detected by the power detection unit 20A and the temperature $T_a$ of the external air determined by the temperature determination unit 20B. According to this configuration, the in-vehicle temperature estimation device 30 can estimate the temperatures at the first location P2 and the second location P1 without having to provide a configuration that directly measures the temperatures at the first location P2 and the second location P1.

The temperature Ta of the external air includes the temperature of the inflow gas flowing into the heated object 11, the temperature determination unit 20B detects the temperature of the inflow gas, and the arithmetic unit 20C performs computations to estimate the temperatures at the first location P2 and the second location P1 based on the supplied power P and the temperature of the inflow gas. As the inflow gas flows into the heated object 11, it may greatly affect the temperature of the heated object 11. Therefore, according to this configuration, the temperature of the heated object 11 can be estimated more accurately by detecting the temperature of the inflow gas.

The arithmetic unit 20C performs computations to estimate the temperatures at the first location P2 and the second location P1 in the heated object 11 based on the supplied power P and the temperature Ta of the external air. According to this configuration, the temperature of the heated object 11 can be estimated more precisely as the temperatures at the first location P2 and the second location P1 (i.e., the temperatures at multiple locations) are estimated.

The arithmetic unit 20C estimates the temperature $T_{2\Delta t}$ at the first location P2 of a plurality of locations after a predetermined infinitesimal time Δt has elapsed based on the current temperature $T_{2\Delta t}$ the first location P2, the external air side thermal resistance $R_2$ from the first location P2 to the external air of the heated object 11, the heat capacity $C_2$ at the first location P2, the current temperature $T_1$ at the second location P1, which is one of the plurality of locations and different from the first location P2, the internal side thermal resistance $R_1$ from the first location P2 to the second location P1, and the temperature $T_a$ of the external air. The arithmetic unit 20C estimates the temperature at the second location P1 after a predetermined infinitesimal time Δt has elapsed based on the supplied power P, the current temperature $T_2$ at the first location P2, the current temperature $T_1$ at the second location P1, the internal side thermal resistance $R_1$ from the second location P1 to the first location P2, and the internal side heat capacity $C_1$ of the second location P1. According to this configuration, the temperature of the heated object 11 can be estimated more precisely as the temperatures at the first location P2 and the second location P1 (i.e., the temperatures of multiple locations) are estimated. Furthermore, the temperature of each location after a predetermined infinitesimal time Δt can be known in advance so that the actual temperature of each of the locations can be controlled to prevent it from reaching the temperature to be avoided.

The in-vehicle temperature estimation device 30 further includes an adjustment unit 20D that adjusts the external air side thermal resistance $R_2$ based on at least one of the temperature $T_a$ of the external air or the flow rate $V_P$ of the gas flowing into the heated object 11. According to this configuration, the temperature at the first location P2 can be estimated more accurately as the temperature $T_a$ of the external air and the flow rate $V_P$ of the gas flowing into the heated object 11 can be factored in the external air side thermal resistance $R_2$.

The heated object 11 is an EHC disposed in the emission path of the exhaust gas discharged from an internal combustion engine. According to this configuration, it is possible to perform control to excellently purify the exhaust gas by estimating the temperature of the EHC.

The adjustment unit 20D adjusts the external air side thermal resistance R2 based on the rotational speed RE of the internal combustion engine. According to this configuration, the temperature of the EHC can be estimated more accurately as the possibly ever-changing rotational speed RE of the internal combustion engine can be factored into the external air side thermal resistance R2.

The heated object 11 is configured to operate by receiving power supply from the DC/DC converter 13, and the in-vehicle temperature estimation device 30 includes a power control unit 20 that controls the DC/DC converter 13. The power control unit 20 generates a temperature maintenance signal Ms for controlling the operation of the DC/DC converter 13 to maintain the temperature at the first location P2 within the temperature range of the predetermined temperature maintenance region Rm based on the computational results of the arithmetic unit 20C. According to this configuration, the temperature of the heated object 11 can be controlled by controlling the operation of the DC/DC converter 13 with the temperature maintenance signal Ms generated by the power control unit 20.

The heated object 11 has the NTC characteristics, in which the resistance value decreases within a predetermined temperature range as its own temperature rises. The NTC characteristics have a small change region S, in which the temperature characteristic of the resistance value of the resistive section 11A of the heated object 11 is smaller than the variation of the resistance value of the resistive section 11A. The arithmetic unit 20C performs computations to estimate the temperatures at the first location P2 and the second location P1 at least when the temperature of the heated object 11 is in the temperature maintenance region Rm and in the small change region S. According to this configuration, the in-vehicle temperature estimation device 30 can perform excellent estimation of the temperatures at the first location P2 and the second location P1 when the temperature maintenance region Rm is included in the small change region S, in which the temperature characteristic of the resistance value of the resistive section 11A of the heated object 11 is smaller than the variation of the resistance value of the resistive section 11A.

Second Embodiment

Figure 5:
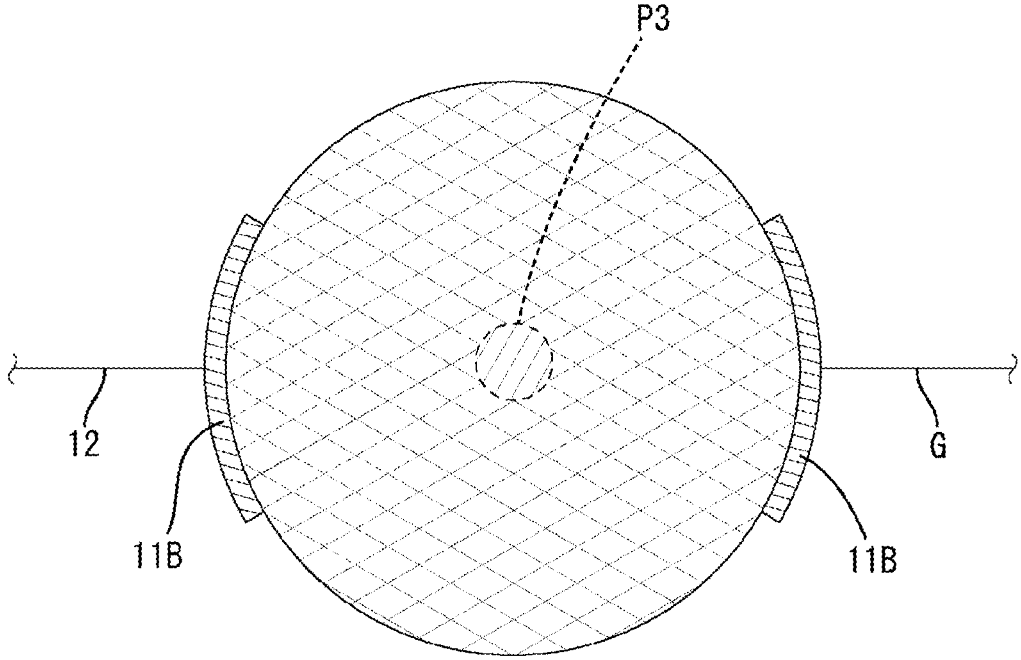
FIG. 5 is a cross-sectional view of the heated object of a second embodiment cut in a direction perpendicular to the central axis thereof.
Figure 6:
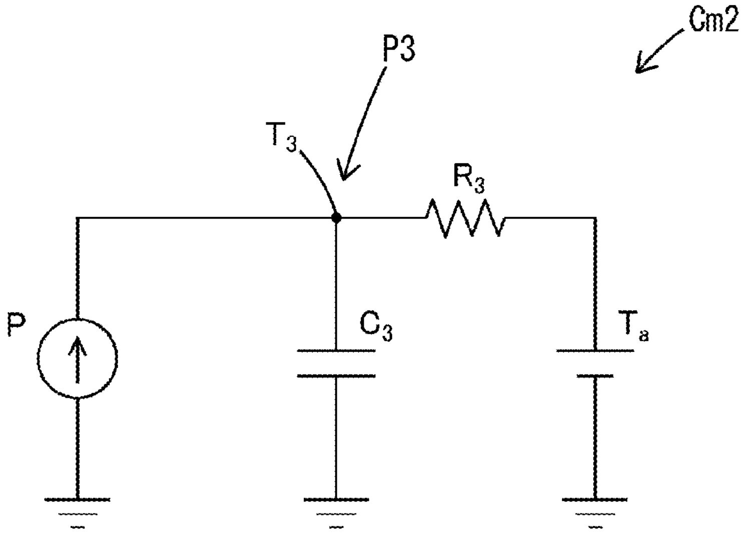
FIG. 6 is a thermal circuit model of the heated object of the second embodiment.

An in-vehicle temperature estimation device 130 according to a second embodiment of the present disclosure will be described below with reference to FIGS. 1, and 5-6, etc. The in-vehicle temperature estimation device 130 according to the second embodiment differs from the first embodiment in the method of computation at the arithmetic unit 20C to estimate the temperature at the location P3 (the center of the heated object 11) in the heated object 11. The configuration of the in-vehicle temperature estimation device 130 is the same as that of the first embodiment. For the configuration of the in-vehicle temperature estimation device 130, reference is made to FIG. 1, and description of the same structures and the same actions and effects as in the first embodiment will be omitted.

With the center in the heated object 11 as a location P3 (the center of the heated object 11) (see FIG. 5), the arithmetic unit 20C estimates the temperature of this location. The temperature at the location P3 of the heated object 11 is estimated by using the thermal circuit model Cm2 shown in FIG. 6, which models the heated object 11.

The thermal circuit model Cm2 is composed of the supplied power P, the external air side thermal resistance $R_3$, the heat capacity $C_3$ of the location P3, and the temperature $T_a$ of the external air. The external air side thermal resistance $R_3$ and the heat capacity $C_3$ of the location P3 are stored, for example, as predetermined fixed values in a storage area provided in the in-vehicle temperature estimation device 130. The external air side thermal resistance $R_3$ can be adjusted by the adjustment unit 20D. Furthermore, the external air side thermal resistance $R_3$ and the heat capacity $C_3$ of the location P3 may also be selected from computations based on predetermined formulae and values corresponding to the external temperature and the rotational speed of the internal combustion engine in a table of data stored in the storage area.

The heat flow in the location P3 is expressed by the following formula denoted by Math. 4.

$$P*\Delta t+\frac{(-T_3+T_a)}{R_3}*\Delta t=C_3*(T_{3\Delta t}-T_3) \quad \text{[Math. 4]}$$

P*Δt is the quantity of heat flowing to the location P3 of the heated object 11, $((-T_3+T_a)/R_3)*\Delta t$ is the quantity of heat flowing from the location P3 to the outside of the heated object 11, and $C_3*(T_{3\Delta t}-T_3)$ is the quantity of heat accumulated in the location P3. From the formula denoted by Math. 4, the arithmetic unit 20C estimates the temperature $T_{3\Delta t}$ of the location P3 after a predetermined infinitesimal time Δt has elapsed based on the supplied power P, the current temperature $T_3$ of the location P3, the external air side thermal resistance $R_3$ from the location P3 to the external air outside the heated object 11, the heat capacity $C_3$ of the location P3, and the temperature $T_a$ of the external air.

For example, in the second embodiment, if the start switch (e.g., ignition switch) of the vehicle in which the in-vehicle system 100 is installed is in the OFF state, it is assumed that $T_3=T_a$. This formula is valid when the temperature of the heated object 11 has sufficiently dropped by maintaining the start switch in the OFF state for a long time. Therefore, $T_{3\Delta t}$ can be obtained by assuming $T_3=T_a$ when initially performing the computation in Math. 4 at the arithmetic unit 20C. The value detected by the external temperature acquisition unit 20E before the activation of the internal combustion engine is used as $T_a$. Then, when the arithmetic unit 20C performs the computation of Math. 4 at the next cycle, $T_{3\Delta t}$ after the elapse of another Δt is obtained by substituting the previously obtained $T_{3\Delta t}$ into $T_3$. Thus, the arithmetic unit 20C repeats the computation of Math. 4 at each predetermined cycle (e.g., each Δt) based on the supplied power P and the temperature $T_a$ of the external air (the result of detection by the external temperature acquisition unit 20E). The arithmetic unit 20C then performs estimation to sequentially estimate the temperature $T_{3\Delta t}$ of the location P3 after the elapse of an infinitesimal time Δt.

Similar to the first embodiment, the adjustment unit 20D adjusts the external air side thermal resistance R3 based on the temperature Ta of the external air and the flow rate VP of the gas flowing into the heated object 11. The arithmetic unit 20C then performs an estimation of the temperature at the location P3 using the external air side thermal resistance R3, which has been adjusted at the adjustment unit 20D.

The arithmetic unit 20C of the in-vehicle temperature estimation device 130 estimates the temperature at the location P3 after a predetermined infinitesimal time Δt has elapsed based on the supplied power P, the current temperature $T_3$ of the location P3, the external air side thermal resistance $R_3$ from the location P3 to the external air outside the heated object 11, the heat capacity $C_3$ of the location P3, and the temperature $T_a$ of the external air. According to this configuration, the temperature at the location P3 after a predetermined infinitesimal time Δt has elapsed can be known in advance so that the actual temperature at the location P3 can be controlled to prevent it from reaching the temperature to be avoided.

Other Embodiments

The present disclosure is not limited to the embodiments described by the foregoing description and drawings. For example, the features of the embodiments described above or below can be combined in any manner as long as there is no inconsistency. Moreover, any of the features of the embodiments described above or below may be omitted unless it is specified as being essential. Additionally, the embodiments described above may be modified as below.

Unlike the first embodiment, the external temperature acquisition unit may be configured to detect the resistance value of the heated object immediately after the start of current flow. For example, the external temperature acquisition unit detects the resistance value of the heated object by dividing the voltage value detected at the voltage detection unit by the current value detected at the current detection unit. The temperature determination unit has stored therein the NTC characteristics of the heated object in the form of a table of data. In this table of data, the resistance value of the heated object calculated at the external temperature acquisition unit is associated with the temperature value of the heated object that corresponds to that value. As used herein, "immediately after the start of current flow" refers to immediately after the start of power supply to the heated object.

For example, the external temperature acquisition unit calculates, from the current value and the voltage value input from the current detection unit and the voltage detection unit immediately after the start of power supply to the heated object, the resistance value of the heated object immediately after the start of supplied power to the heated object. Then, the temperature determination unit determines the temperature of the heated object immediately after the start of power supply to the heated object based on the calculated value (the resistance value) and the NTC characteristics of the heated object stored in itself. The temperature determined at this point is used as the temperature of the external air. That is, the temperature of the external air incorporates the resistance value of the heated object immediately after the start of current flow. Subsequently the arithmetic unit estimates the temperature at the location based on the power supply and the temperature of the external air that incorporates the resistance value of the heated object. According to this configuration, it is possible to estimate the temperature at the location without using a configuration to directly measure the temperature of the external air.

Unlike the first embodiment, a thermal circuit model in which a series of three or more locations may be used to estimate the temperature of each location.

Unlike the first embodiment, the temperature estimation device may be used to estimate the temperature of a component other than an EHC as the heated object. In this case, the arithmetic unit performs the estimation operation based on a thermal circuit model that is freshly constructed according to the target component.

Unlike the first embodiment, the adjustment unit may be configured to adjust the external air side thermal resistance based on either the temperature of the external air or the flow rate of the gas flowing into the heated object.

Unlike the first embodiment, the external temperature acquisition unit may be provided on an electrode plate or on the outer peripheral surface of the heated object, and the temperature of such a location may be used as the temperature of a location that is outside the heated object and different from the location.

Unlike the first embodiment, the current temperature at the second location may be detected by a temperature sensor, and this detection value may be used to estimate the temperature at the first location. In other words, the temperature at the first location may be estimated using the temperature of the external air and the temperature at the second location (a different location than the location in the heated object).

It should be noted that the embodiments disclosed herein should be considered in all respects only to be illustrative and not restrictive. The scope of the present disclosure is not limited to the embodiments disclosed herein, and the scope indicated by the claims or all changes which come within the scope of equivalency of the claims are intended to be encompassed therein.

The invention claimed is:

1. An in-vehicle temperature estimation device applied to an in-vehicle heated object that is heated by current flow, the in-vehicle temperature estimation device comprising:
- a power detection unit for detecting power supplied to a plurality of the locations in the heated object;
- an arithmetic unit for performing a computation to estimate temperatures of the plurality of the locations in the heated object; and
- a temperature determination unit for determining a temperature of external air outside the heated object;
- wherein the arithmetic unit performs a computation to estimate the temperature at each of the plurality of locations based on the supplied power detected by the power detection unit and the temperature of the external air determined by the temperature determination unit;
- wherein the arithmetic unit estimates:
  - a temperature of a first location of the plurality of locations after a predetermined time has elapsed based on a current temperature at the first location, external air side thermal resistance from the first location to the external air of the heated object, heat capacity of the first location, a current temperature of a second location of the plurality of locations that is different from the first location, internal side thermal resistance from the first location to the second location, and the temperature of the external air; and
  - a temperature at the second location after a predetermined time has elapsed based on the supplied power, the current temperature at the first location, the current temperature at the second location, internal side thermal resistance from the second location to the first location, and internal side thermal capacity of the second location.

2. The in-vehicle temperature estimation device according to claim 1, wherein the temperature of the external air includes a temperature of inflow gas flowing into the heated object;
- wherein the temperature determination unit detects the temperature of the inflow gas; and
- wherein the arithmetic unit performs a computation to estimate the temperature at the location based on the supplied power and the temperature of the inflow gas.

3. The in-vehicle temperature estimation device according to claim 1, wherein the arithmetic unit estimates the temperature at the location after a predetermined time has elapsed based on the supplied power, a current temperature at the location, external air side thermal resistance from the location to the external air of the heated object, heat capacity of the location, and the temperature of the external air.

4. The in-vehicle temperature estimation device according to claim 1 further comprising an adjustment unit for adjusting an external air side thermal resistance based on at least one of the temperature of the external air or a flow rate of the external air flowing into the heated object.

5. The in-vehicle temperature estimation device according to claim 1, wherein the heated object is an electrically heated catalyst (EHC) disposed in an exhaust path of gas discharged from an internal combustion engine.

6. The in-vehicle temperature estimation device according to claim 1, further including an adjustment unit that adjusts an external air side thermal resistance based on a rotational speed of the internal combustion engine.

7. The in-vehicle temperature estimation device according to claim 1, wherein the heated object is configured to operate upon receiving power supply from a drive unit;
- wherein the in-vehicle temperature estimation device comprises a power control unit for controlling the drive unit;
- wherein the power control unit generates a temperature maintenance signal for controlling operation of the drive unit to maintain the temperature at the location within a temperature range of a predetermined temperature maintenance region based on computational results of the arithmetic unit.

8. The in-vehicle temperature estimation device according to claim 7, wherein the heated object has negative temperature coefficient (NTC) characteristics in which the higher its own temperature rises within a predetermined temperature range, the lower a resistance value becomes;

wherein the NTC characteristics have a small change region where a temperature characteristic of the resistance value of the heated object is smaller than a variation of the resistance value;

wherein the arithmetic unit performs a computation to estimate the temperature at the location at least when the temperature of the heated object is in the temperature maintenance region and in the small change region.

* * * * *